June 8, 1971   J. W. HAMMOND   3,583,055
LEAD MAKING MACHINE AND METHOD
Filed Sept. 17, 1969   10 Sheets-Sheet 1
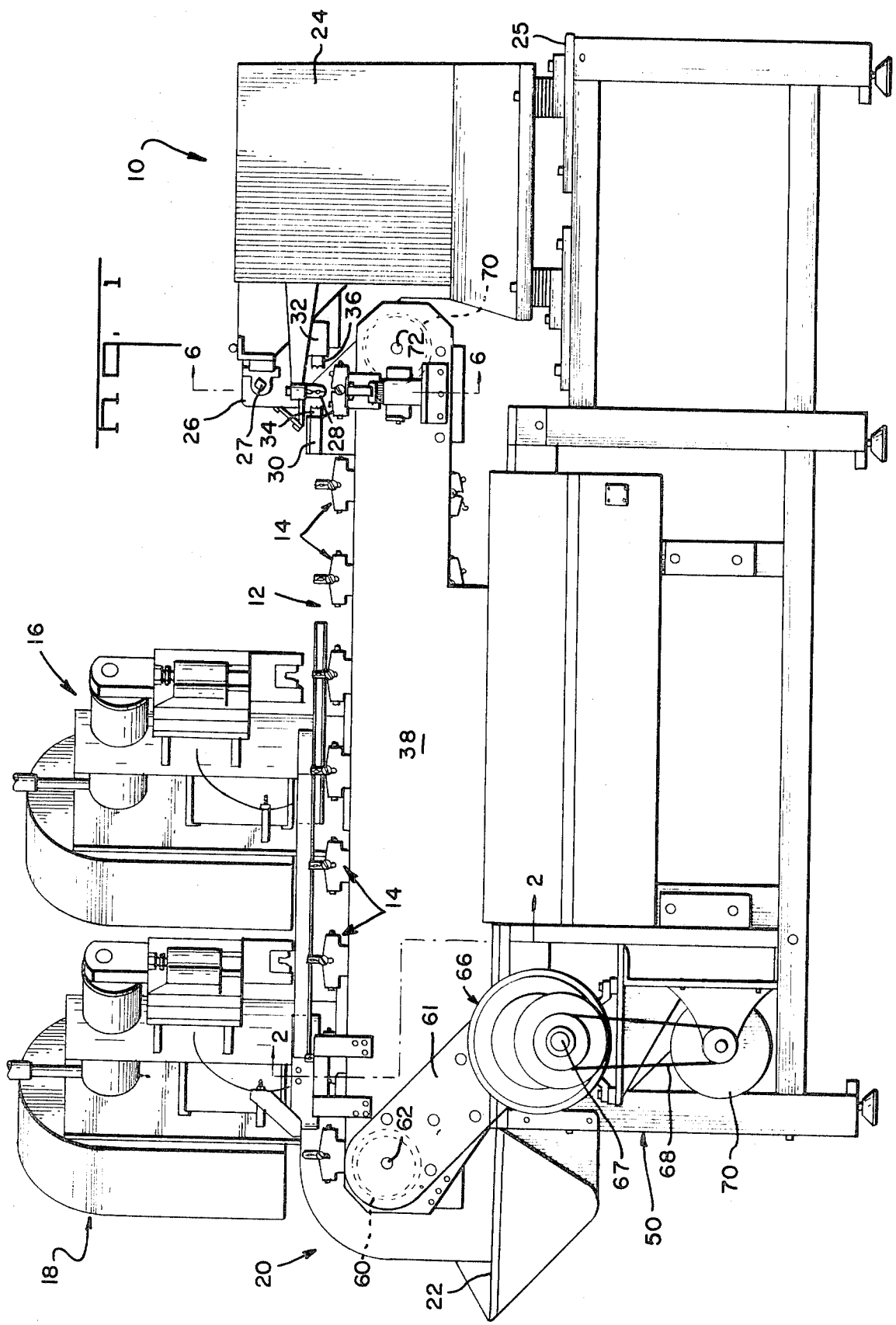

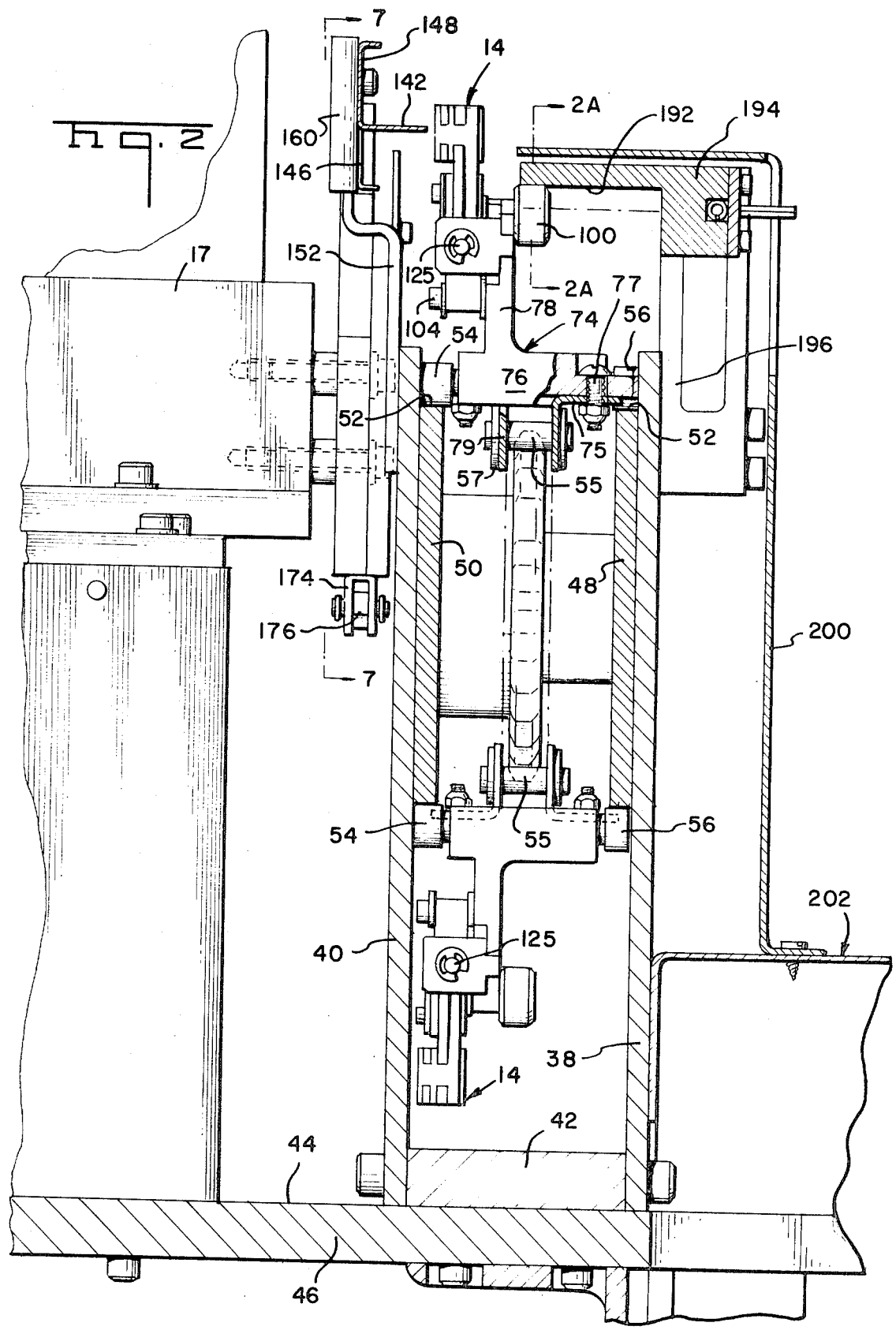

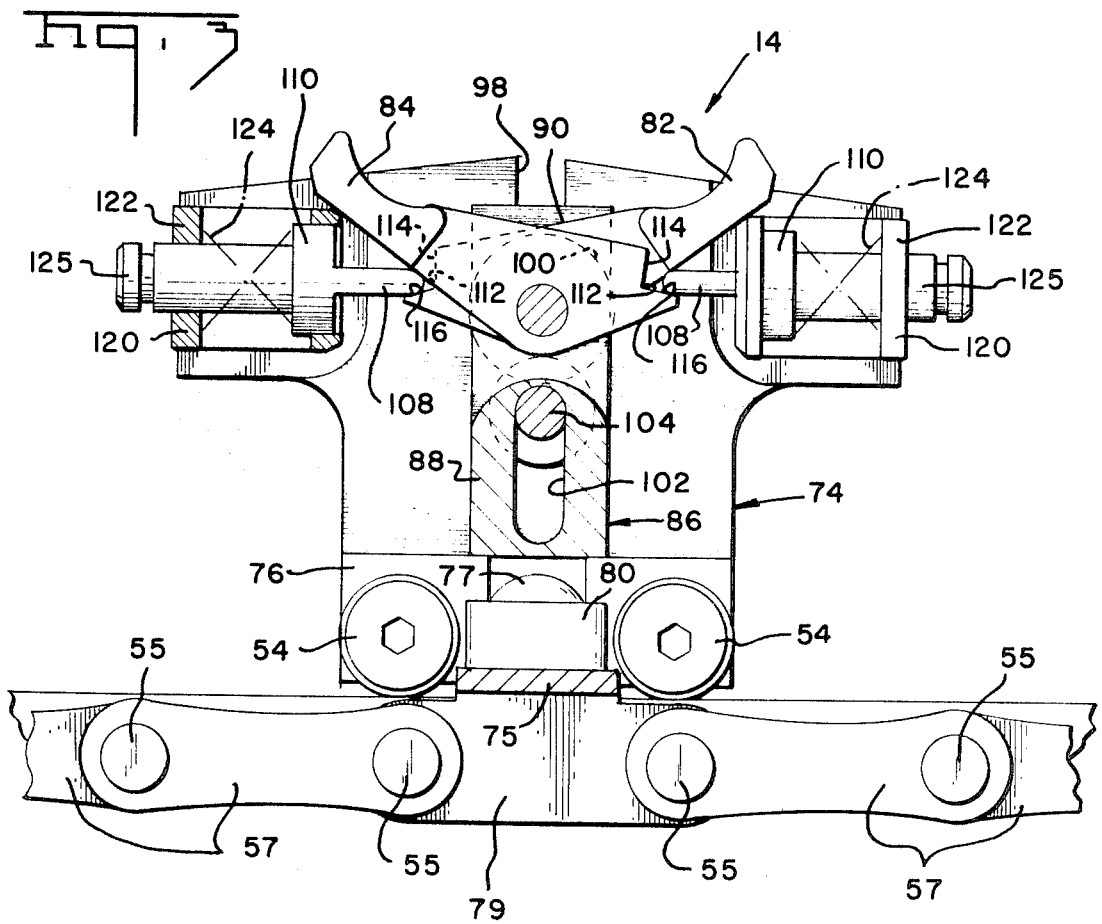
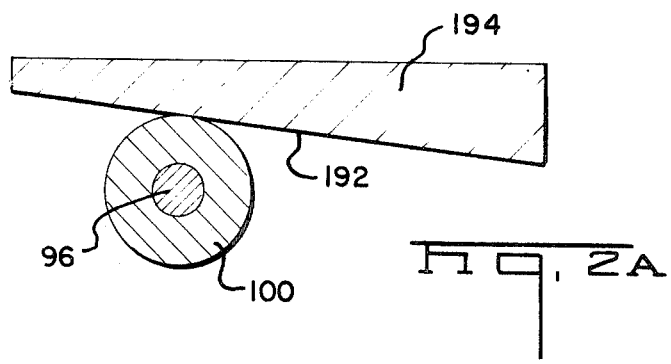

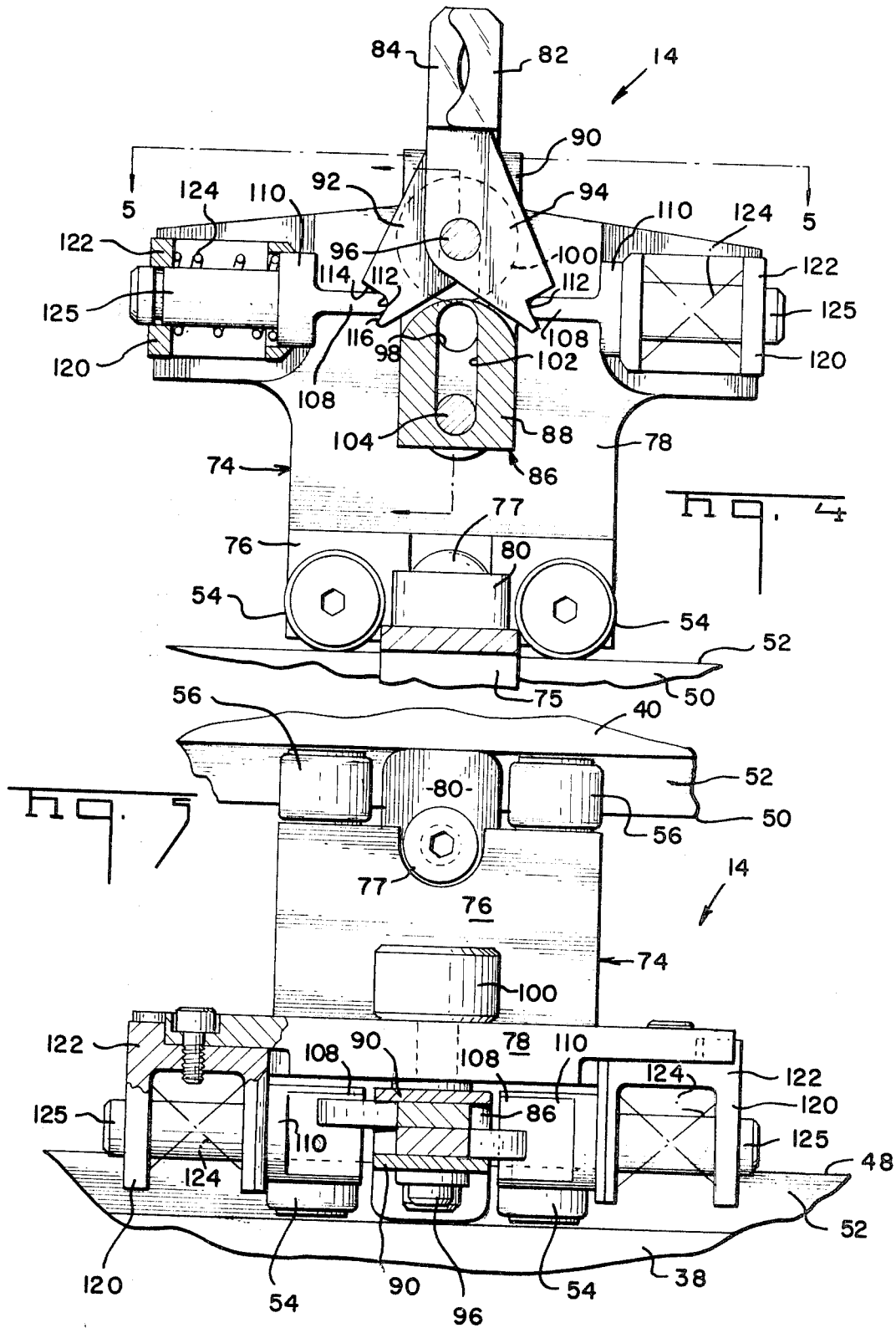

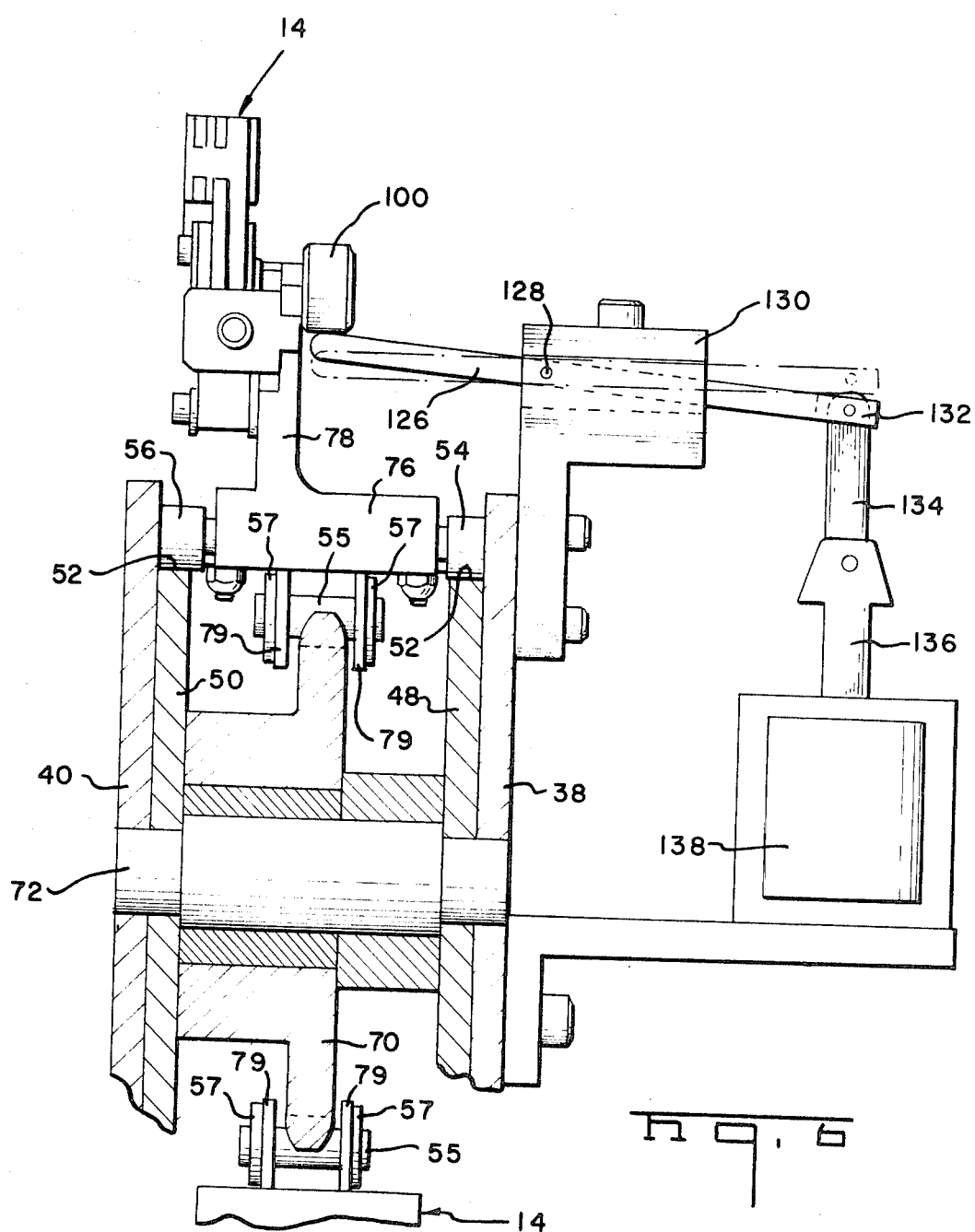

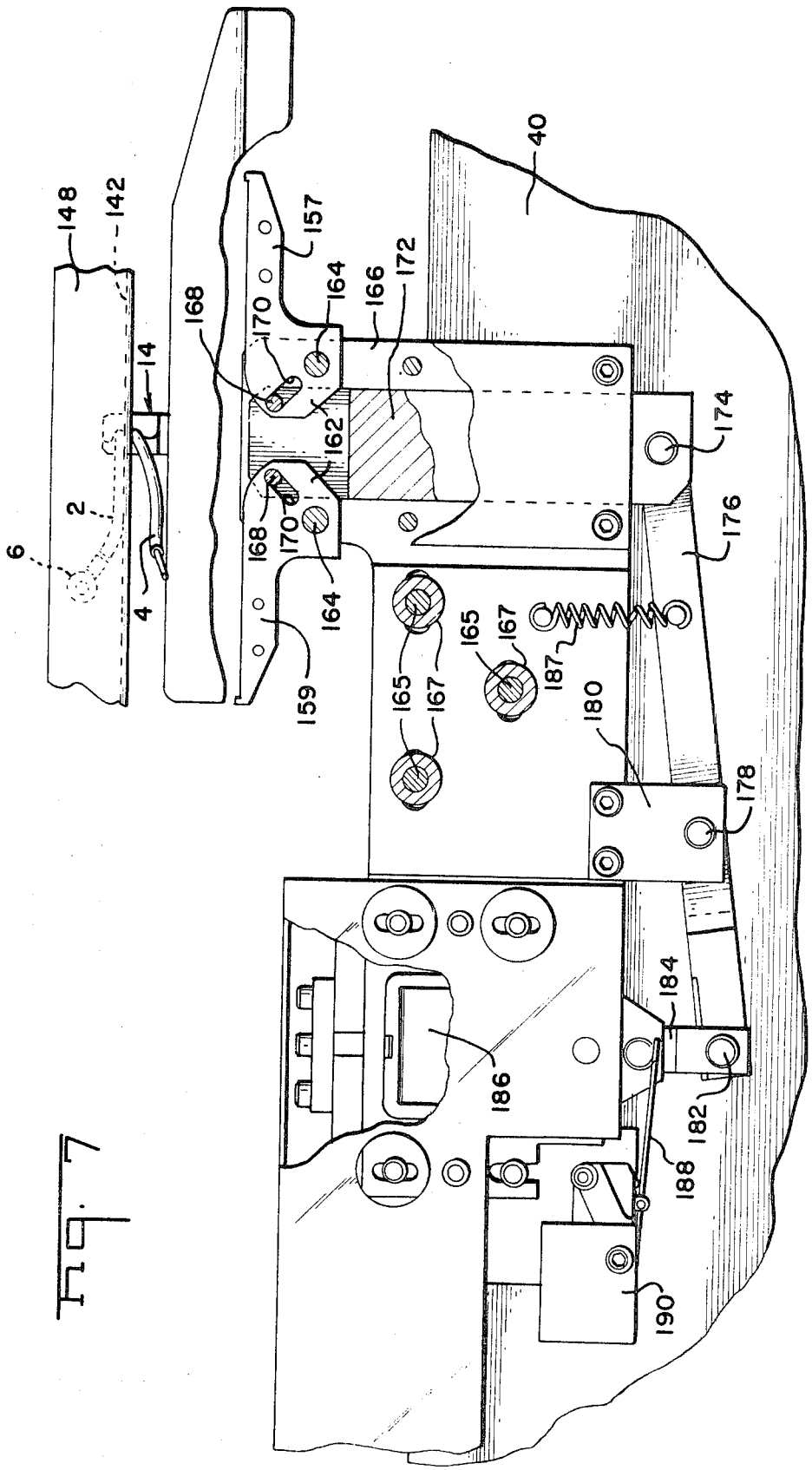

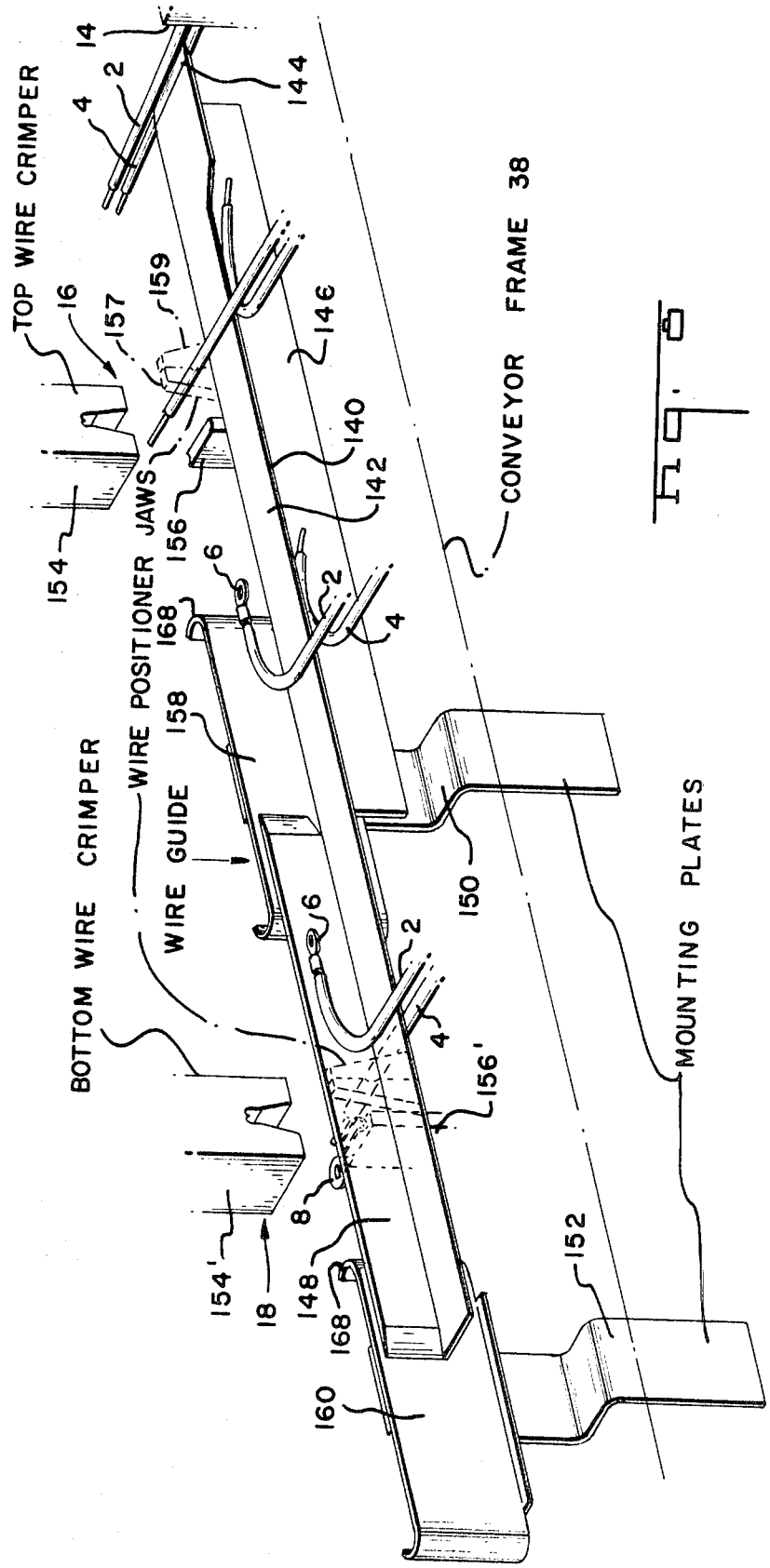

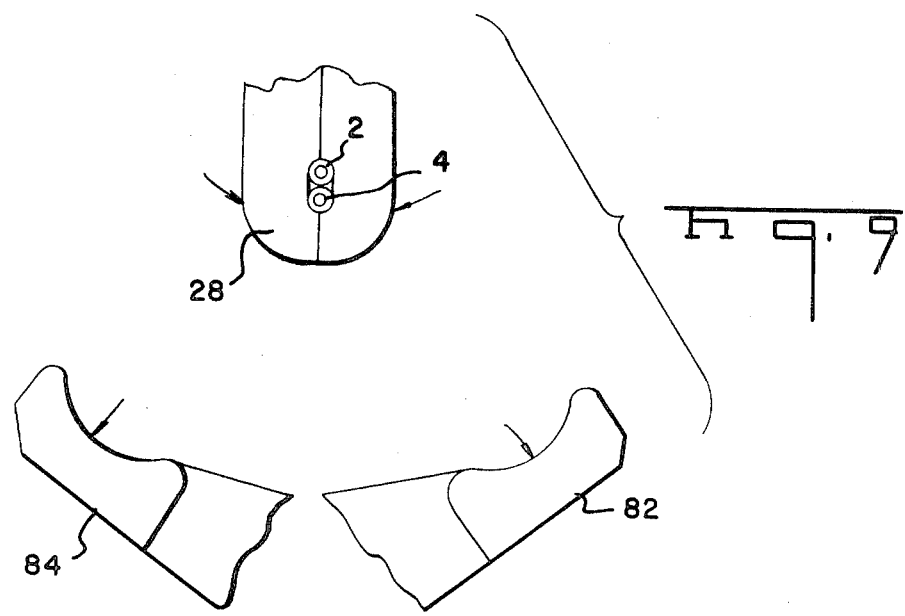
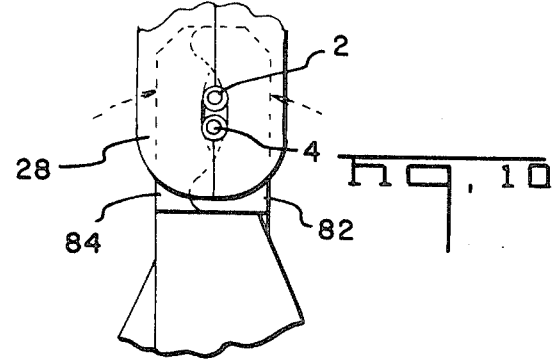
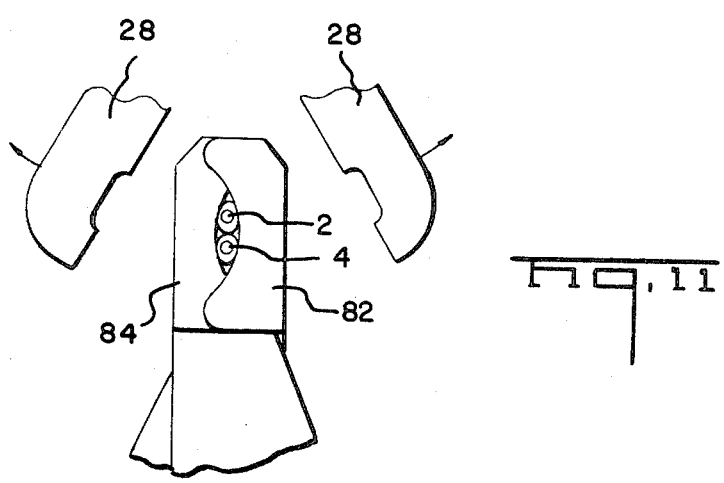

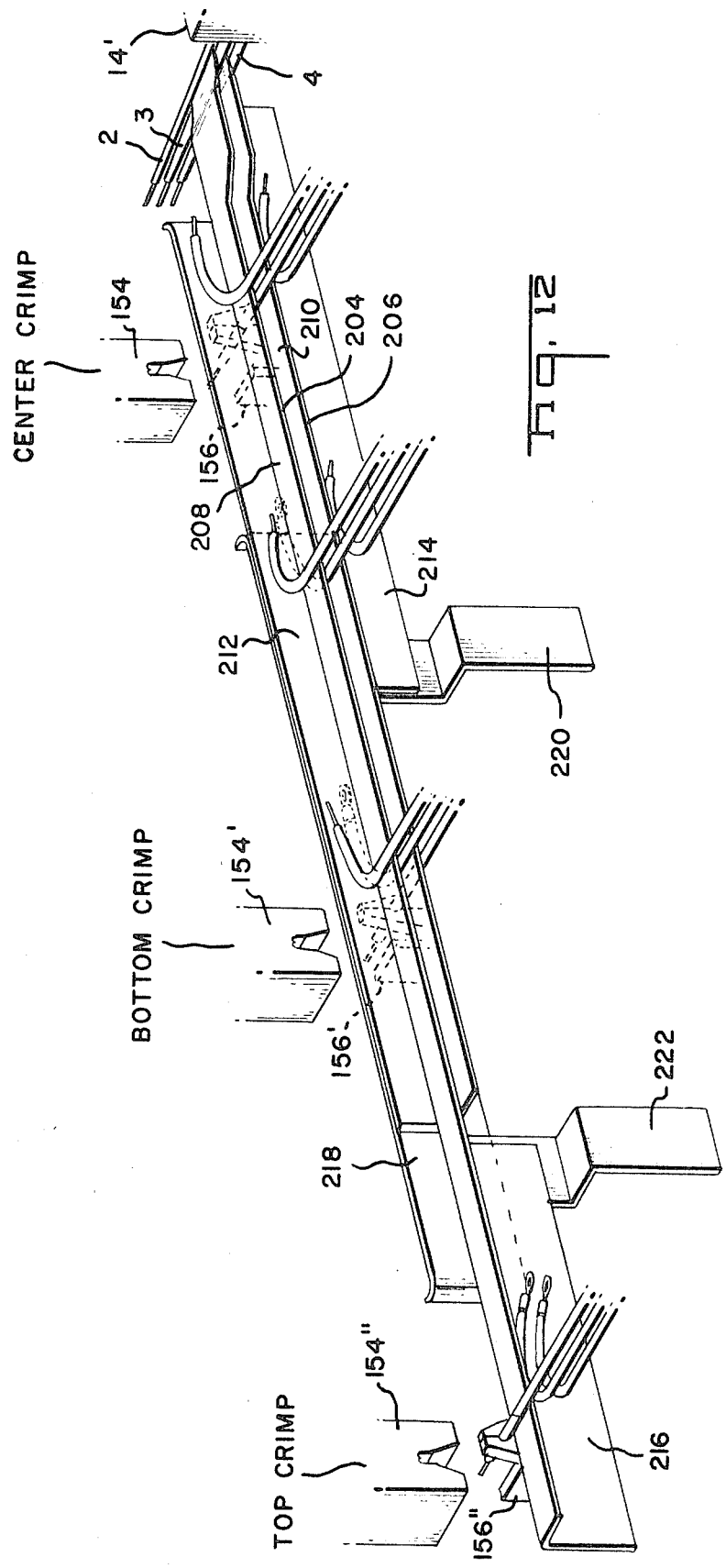

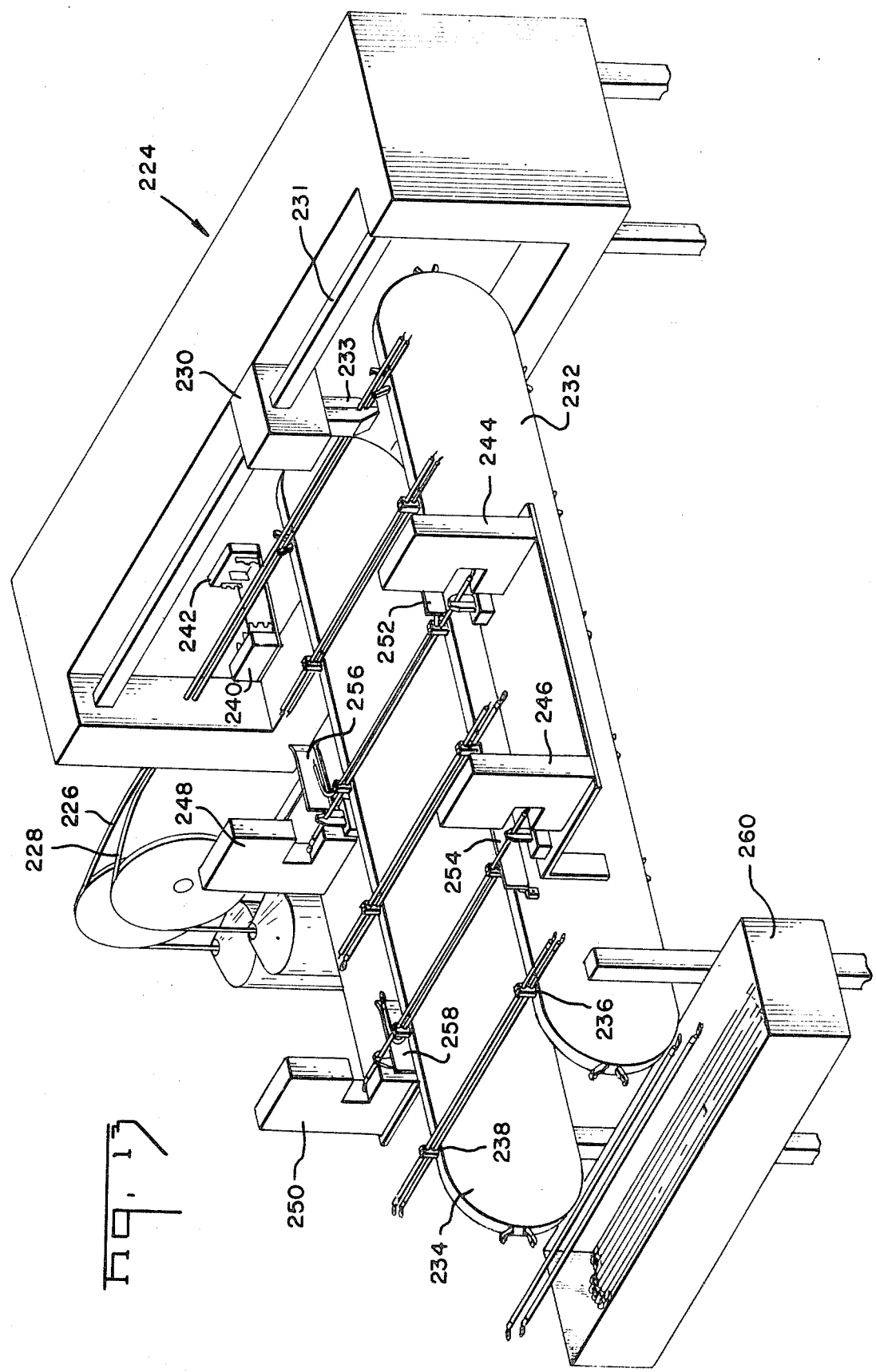

United States Patent Office 3,583,055
Patented June 8, 1971

3,583,055
LEAD MAKING MACHINE AND METHOD
James Woodrow Hammond, Camp Hill, Pa., assignor to AMP Incorporated, Harrisburg, Pa.
Continuation-in-part of application Ser. No. 814,361, Apr. 8, 1969. This application Sept. 17, 1969, Ser. No. 858,666
Int. Cl. H01r 11/08
U.S. Cl. 29—203D                                8 Claims

ABSTRACT OF THE DISCLOSURE

Lead making machine comprises a conveyor having a plurality of spaced apart wire gripping devices mounted thereon, each wire gripping device being adapted to hold two or more electrical leads disposed one above the other in a manner such that the axes of the leads define a plane which extends normally of the plane defined by the path of the conveyor. Crimping presses are provided beside the conveyor and are adapted to apply terminals to the ends of the leads. Adjacent to each of the crimping presses, there is provided a static plate which selectively deflects the projecting ends of all but one of the leads so that one lead is selectively presented to the crimping press.

BACKGROUND OF THE INVENTION

This application is a continuation-in-part of application Ser. No. 814,361 filed Apr. 8, 1969 for Lead Making Machine, now abandoned. U.S. Pat. 2,768,425 shows a lead making machine comprising a chain type conveyor having a plurality of wire gripping jaws at spaced-apart locations thereon in combination with a known type of wire feeding and insulation stripping machine. The cut and stripped leads produced by the feeding and stripping machine are delivered to the jaws of the conveyor and are conveyed laterally of their axes so that one end of each lead is presented to a crimping press located downstream, relative to the path of movement of the conveyor, from the cutting and stripping apparatus. Machines of the type shown in U.S. Pat. 2,768,425 thus produce a succession of electrical leads, each lead having a terminal applied to one of its ends. U.S. Pat. 3,029,494, shows a machine which is, in some respects, similar to the machine shown in 2,768,425 but which is adapted to apply terminals to both of the ends of each lead.

The instant invention is concerned with, inter alia, improvements to lead making machines of the type shown in the above-identified patents which result in the achievement of substantially increased production rates. The invention is also concerned with conveyors for filamentary articles, such as wires, and the selective presentation of such articles to work stations on the conveyor path.

It is accordingly an object of the invention to provide an improved lead making machine. A further object of the invention is to substantially increase the production rate for a known type of lead making machine. A still further object is to provide a conveyor having gripping jaws thereon each of which is adapted to grip a plurality of filamentary articles and including means for selectively deflecting all but one of the articles held in each gripping means at each of several working stations along the path of the conveyor thereby to present each article to one of the working stations.

Other objects of the invention are achieved in a preferred embodiment thereof which is briefly described in the foregoing abstract, which is described in detail in the description presented below, and which is shown in the accompanying drawings in which:

FIG. 1 is a front view of a preferred form of lead making machine in accordance with the invention.

FIG. 2 is a transverse sectional view taken along the lines 2—2 of FIG. 1.

FIG. 2A is a view taken along the lines 2A—2A of FIG. 2.

FIG. 3 is a frontal view, with parts in section, of one of the lead gripping means mounted on the conveyor of the apparatus in FIG. 1, this view showing the positions of the parts when the jaws are open.

FIG. 4 is a view similar to FIG. 3 but showing the positions of the parts with the jaws closed.

FIG. 5 is a view taken along the lines 5—5 of FIG. 4.

FIG. 6 is a view taken along the lines 6—6 of FIG. 1 showing the mechanism for closing the wire gripping jaws on the conveyor chain.

FIG. 7 is a view taken along the lines 7—7 of FIG. 2 showing the stationary lead positioning jaws adjacent to each of the crimping presses and showing the mechanism for closing and opening these jaws.

FIG. 8 is a perspective view showing details of the static deflecting means for deflecting the leads carried by the gripping jaws during movement of the conveyor to effect presentation of each lead to one of the crimping presses.

FIGS. 9, 10, and 11, are fragmentary views showing a pair of conveyor gripping jaws and showing the wire pulling jaws of the wire feeding and insulation stripping machine, these views illustrating the movement of the stripping jaws and the manner in which the leads are delivered to the conveyor jaws.

FIG. 12 is a fragmentary perspective view, similar to FIG. 8, showing a modified form of wire deflecting means in accordance with the invention.

FIG. 13 is a perspective semi-schematic view of a lead making machine in accordance with an alternative embodiment of the invention.

FIGS. 1–11 show an embodiment of the invention which, during each operating cycle, produces two electrical leads 2, 4, each lead having an electrical terminal 6, 8 crimped onto its end. This embodiment of the invention comprises generally an apparatus 10 for feeding two wires from endless sources such as barrels or reels, severing electrical leads from the ends of the fed wires, and stripping insulation from the trailing ends of the leads and from the leading ends of the wires. This apparatus is advantageously constructed in accordance with the teachings of U.S. Pats. 2,680,394 and 2,929,284.

The pair of leads produced during each operating cycle by the apparatus 10 are delivered to one of the spaced apart wire grippers 14 of a conveyor generally indicated at 12. This conveyor moves leftwardly on its upperside as viewed in FIG. 1 so that the trailing ends of the leads gripped in the lead grippers 14 are presented to crimping presses 16, 18. In accordance with the principles of the instant invention, one of the leads is deflected at each crimping press so that the other lead is selectively presented to that press and both leads are thus terminated during movement of the conveyor along its path. The leads are released from the lead grippers at a discharge station generally indicated at 20 and drop into a bin 22.

The wire feeding, cutting, and stripping apparatus comprises generally a housing 24 in which the various mechanisms disclosed in U.S. Pat. 2,680,394 are contained and which is supported on suitable supporting table 25. A reciprocable head 26 is mounted on a rod 27 on one side of the housing 24 and has a pair of wire pulling jaws 28 depending from its underside. The head reciprocates on the rod 27 and during each cycle, grasps a pair of wires extending from barrels or reels, and pulls the wires along a path extending toward the conveyor and between a pair of reciprocable blocks 30, 32. These blocks have wire cutting blades and insulation cutting blades mounted thereon as generally indicated at 34, 36 and moved relatively towards each other after movement of the head and the wire pulling jaws to the end of its stroke. The two wires are cut and insulation adjacent to the trailing ends of the leads, and the insulation adjacent to the leading ends of the wires, is circumferentially severed. The wires and leads are then pulled axially to strip insulation from the trailing ends and leading ends respectively of the leads and wires. The manner in which the wire pulling jaws deliver the severed leads to the grippers 14 will be described below.

The conveyor 12 is supported between front and rear frame plates 38, 40 (FIG. 2) which are mounted on the upper surface 44 of a supporting table 46, a bracing plate 42 being provided between the frame plates to hold them in proper spaced relationship to each other. Guide plates 48, 50 are fixed to the opposed faces of the frame plates 38, 40 by welding or any other suitable manner, and have edge portions 52 which support rollers 54, 56 mounted on the individual lead gripper assemblies 14.

The conveyor further comprises a chain having links 57 and pins 55 which is supported and driven at its lefthand end as viewed in FIG. 1 by a drive sprocket 60 mounted on a shaft 62. This shaft is coupled by a gear train, contained in a gear train housing 61, to a combination speed reducer and single revolution clutch 66, the input shaft 67 of which is coupled by a belt or chain 68 to a suitable motor 70 mounted in the lower portions of the supporting structure 50. The righthand end of the conveyor chain is supported on an idler sprocket 70 (FIG. 6) mounted on a shaft 72 which is journaled in the frame plates. It will be apparent from the foregoing description that during each operating cycle, the single revolution clutch is engaged to rotate the drive sprocket 60 by an amount sufficient to move the individual lead gripper assemblies 14 a distance equal to the spacing between adjacent grippers on the chain. The single revolution clutch is electrically engaged by a suitable microswitch or other switch device (not specifically shown) which is closed after the wire feeding, cutting, and stripping mechanism has completed its wire feeding, cutting, and stripping cycle. The combination speed reducer and clutch 66 may be of any suitable type, for example, an IDU–ADU acceleration-deceleration unit, Part number 175-1-810HAL manufactured by the Hilliard Corporation of Elmira, N.Y.

Each of the individual lead grippers 14 (FIGS. 2–5) on the conveyor comprises a frame block 74 having a base portion 76 and a laterally extending arm 78 which is parellel to, and between the frame plates, 38, 40. The ends of the base portion 76 are of reduced width as shown at 80 and are disposed adjacent to the surfaces of the frame plates 38, 40, the previously identified rollers 54, 56 being mounted on the block on each side of these reduced width ends. The block is supported on the chain by means of angle brackets 75, each bracket having one flange secured to the underside of the block by a fastener 77 and having an inwardly extending flange 79 which is mounted on one of the chain pins 55 as shown best in FIG. 2.

The lead gripping jaws 82, 84 have enlarged lower ends of reduced thickness 92, 94 which are disposed between the arms 90 of a yoke member 86. The lower ends of the jaws are pivotally mounted, scissors fashion, on a pin 96 which extends through the yoke arms 90 and through an elongated vertical slot 98 in the frame block arm 78. A roller 100 is mounted on the projecting end of this pin as shown in FIG. 2 and is adapted to be engaged by a lever 126, described below, which raises the yoke to close the jaws. The yoke is guided along a vertical straight line path by means of a slot 102 in its web portion 22 and a screw 104, the intermediate portion of which extends through this slot as shown in FIG. 4.

Opening and closing of the jaws is achieved by means of plungers 110 disposed on each side of the yoke as shown in FIG. 4 having end portions 108 of reduced thickness which enter notches 112 in the lower ends of the enlarged lower portions 92, 94 of the jaw members. These notches 112 have side edges 114, 116, which function as camming surfaces as the yoke member is moved upwardly and downwardly between the positions of FIGS. 3 and 4. The plungers 110 are contained in U-shaped brackets or yokes 122 secured by suitable fasteners to the sides of the frame arm 78. The outer end portions 125 of the plungers are of reduced diameter and springs 124 surround the plungers and bear against the arm 120 thereby to bias the plungers inwardly and towards the notches 112 in the lower large ends of the jaw members.

The opening and closing of the jaws is as follows. When the yoke member 86 is moved upwardly from the position of FIG. 3 to the position of FIG. 4, the edge portions 116 of the notches 112 in the lower ends of the jaw members cooperate with the reduced ends 108 of the plungers to swing the jaw member 82 in a counterclockwise arc and the jaw member 84 in a clockwise arc so that the jaws close when the yoke member reaches the limit of its upward travel as shown in FIG. 4. When the yoke member 86 is moved downwardly from the position of FIG. 4 to the position of FIG. 3, the edge portions 114 of the notches 112 cooperate with reduced ends 108 of the plungers 110 to swing the arms in the opposite directions thereby to open the jaws. It will be noted that the jaws will be resiliently maintained in their open condition when the parts are in the position of FIG. 3 and will be resiliently maintained in their closed condition when the parts are in the position of FIG. 4, by virtue of the fact that the ends 108 of the plungers prevent substantial movement of either jaw member from the positions shown in these figures. The springs 124 are, of course, overcome when the yoke member moves between its extreme positions during opening and closing.

An advantage of the disclosed jaw arrangement and the disclosed type of lead gripping device 14 is that the jaws move upwardly during closure and along an arcuate path towards the wires held by the wire pulling jaws of the feeding, cutting, and stripping machine 10. This advantage is illustrated in FIGS. 9–11 which show the relative positions of the wire pulling jaws of the wire feeding machine 2 and the lead gripping jaws of the conveyor during transfer of two wires from the pulling jaws to the conveyor jaws. In FIG. 9, the wire pulling jaws are in closed engagement with the wires and the conveyor jaws are open so that ample clearance is provided between wire pulling jaws and conveyor jaws to permit movement of the wire pulling jaws past the conveyor. FIG. 10 shows the positions of the parts after the conveyor jaws have moved upwardly and have closed into engagement with the wires. At this stage of the operating cycle, the two sets of jaws will be in alignment with each other with the conveyor jaws behind the pulling jaws as viewed from the front. Subsequently, the pulling jaws open as shown in FIG. 11 and the pulling head on the cutting and stripping machine moves rearwardly away from the conveyor. The opened pulling jaws at this stage will clear the conveyor jaws during such rearward movement of the head as is clearly shown in FIG. 11.

As previously mentioned, the roller 100 on the end of the pin 96 is moved upwardly to close the jaws by means of a lever 126, FIG. 6. This lever is pivotally mounted intermediate its ends at 128 on a bracket 130, the other end 132 of the lever being pivotally connected to link 134 which in turn is pivoted to the actuating rod 136 of a solenoid 138. The solenoid is supported on the external surface of the frame plate 38 as shown. The solenoid 138 may be energized by a suitable switch which in turn is actuated by the wire feeding, cutting, and stripping machine 10.

The static deflecting means, which selectively deflects one of the wires at each of the terminal applicator presses 16, 18, is shown in FIG. 8 to comprise an elongated formed sheet metal structure 140 having a web 142 which extends from a location up-stream (relative to the direction of the conveyor travel) from the first applicator press 16 to a location down-stream from the second applicator 18. The righthand end of this web 142 is swaged to an edge as shown at 144 so that as an individual lead gripper assembly moves past this edge, the two wires held in the lead gripper will be split and one wire will be above the surface of the web 142 and the other wire will be below the surface of the web.

The deflector 140 has a depending flange 146 which begins at a location immediately up-stream from the first terminal applicator press 16 and extends to a location between the two terminal presses. An upstanding flange 148 is also provided on the web 142 and extends from a location between the two terminal presses to a location down-stream from the second terminal press 18. This deflector 140 and some auxiliary deflector plates 158, 160 are secured to, and supported on brackets 150, 152 which in turn are fixed to the rear frame plate 40 as shown in FIG. 2.

It will be apparent from an inspection of FIG. 8 that as an individual lead gripper assembly 14 moves past the righthand end of the web 142 of the deflector, the projecting ends of the two leads 2, 4 will be separated and, as noted above, the upper lead 2 will be located above the surface of the web 142 and the lower lead will be below the surface of this web. When the lower lead engages the righthand end, as viewed in FIG. 8, of the depending flange 146, this lead will be deflected as shown so that the stripped end of the upper lead 2 will be selectively presented to the first crimping press 16. At this station, the crimping die 154 and the anvil 156 move relatively towards each other to apply a terminal 6 to the end of the upper lead. As the individual lead gripper 14 moves from the first terminal applicator press 16 to the second press, the terminated end of the upper lead 2 will move past an auxiliary deflecting plate 158 then past upstanding flange 148 of the deflector 140. The end of this upper lead will thus be deflected as shown and constrained from interfering with the termination of the lower lead 4. The lower lead on the other hand will be permitted to assume its natural more or less straight condition after it passes the lefthand end of the depending flange 146 and will be selectively presented to the crimping die and anvil 154', 156' of the second terminal press. The auxiliary plates 158, 160 are provided on the deflector support brackets 150, 152 to ensure that the terminated end of the upper lead 2 will be carefully deflected without damage to its insulation or its applied termination 6 as it moves into engagement with the upstanding flange 148. In order to achieve such careful deflection of the end, the sides of the plates 168 are curved as shown to provide a smooth surface which brings about deflection of the lead end. The lefthand end of the auxiliary deflector plate 160 is likewise curved to avoid the presence of sharp edges which might nick the insulation of one of the lead ends as the wire grippers move past the deflector means.

The ends of the leads 2, 4 may, or may not accurately position themselves between the crimping dies and anvils at the two crimping stations depending upon the relative stiffness of the leads. The lead ends will extend substantially straight from the lead gripping assemblies after they are delivered to the lead grippers as shown at the extreme right in FIG. 8. The upper lead 2 will thus extend substantially straight towards the first crimping press although it may assume an arcuate configuration and be slightly off center with respect to the crimping die and anvil of the press. In any event, the lower lead 4 is deflected while the upper lead is being terminated and after it passes the lefthand end of the depending flange 146 it probably will not straighten itself sufficiently to locate its stripped end between the crimping die and anvil 154', 156'.

It is desirable to provide a pair of positioning jaws at each crimping station between crimping die and anvil and the rear frame plate to assure accurate location of the stripped ends of the leads. These jaws 157, 159 grip the ends of the leads adjacent to their stripped portions and ensure that the stripped lead ends will in fact be accurately located immediately beneath the crimping dies 154, 154'. Referring to FIG. 7, the lead positioning jaws 157, 159 have enlarged inner ends 162 and are mounted on spaced-apart pivot pins 164 provided in a support plate 166 which is secured to the base portion 17 of the adjacent one of the presses 16, 18 by fasteners 165 and spaces 167. The presses 16, 18 shown are of the type disclosed in U.S. Pat. 3,343,398. The enlarged inner ends of the jaw 162 have pin slot connections 168, 170 with the slotted upper end of a slide member 172 which is guided, for vertical reciprocable motion as viewed in FIG. 7, in the frame plate 166. The lower end of the slide 172 is pivotally connected at 174 to the righthand end, as viewed in FIG. 7, of a lever 176. This lever is pivotally mounted intermediate its ends at 178 on a bracket 180 and has its lefthand end pivoted at 182 to the actuator arm 184 of a solenoid 186. An auxiliary spring 187 is provided on the righthand end of the lever to normally bias the slide to its upper position as shown in FIG. 7. This spring is overcome when the solenoid 186 is energized and the lefthand end of the lever is moved upwardly. A microswitch 190 is mounted adjacent to the solenoid and has a switch arm 188 which is in engagement with a pin on the actuator on the solenoid. When the actuator is moved upwardly as viewed in FIG. 7, this switch is closed thereby to energize the crimping press at the immediately adjacent crimping station so that when the jaws 157, 159 grip the wire and locate it between the crimping die and anvil of the press, the die and anvil will be moved relatively towards each other to apply a terminal to the lead end. As will be explained below, it is desirable to open the jaws 157, 159 immediately prior to the crimping operation in order to avoid stressing of the lead ends at the time of application of the terminals. Such opening of the jaws is achieved by switches on the presses.

Referring to FIG. 2, the jaws of the wire gripper assembly which is adjacent to the bin 22 at the unloading station 20 of the apparatus are opened by means of an inclined cam surface 192 on the underside of a camming block 194 which is mounted on a bracket 196 secured to the front face of the frame plate 38. As the roller 100 of the wire gripper moves along this inclined cam surface, it is forced to move downwardly thereby moving the yoke 86 downwardly and opening the jaws as illustrated in FIGS. 3 and 4. The completed leads are thereby released and fall into the bin.

In addition to the frame members described above, it it desirable to provide suitable hood means as shown at 200, 202 over the front portion or surface of the apparatus. This hood provides smooth surfaces which support the trailing ends of the leads as they are carried along the conveyor path and prevents any portions of the leads from being caught on a sharp object or having the insulation of the lead damaged by engagement with sharp edges.

The hood means 200, 202 also functions as a supporting surface for long leads in that it provides a surface over which such leads are laid out stacked during operation. During movement of the conveyor, the leads are dragged over the lower horizontal surface of the hood and, when each lead is released, it is dropped on the stack of previously completed leads.

The apparatus may be controlled by any suitable circuitry. In the disclosed embodiment, the electrically controlled single revolution clutch in the speed reducer 66 is controlled by a switch means on the wire feeding, cutting and stripping apparatus 10 which engages the clutch after completion of the feeding, cutting and stripping operations. The solenoid 138, which closes the conveyor jaws at the loading station, is also energized by switch means on the apparatus 10. The solenoid 186 which controls the wire gathering jaws (FIG. 7) is energized by a switch means on the single revolution clutch, this switch means being closed at the time of completion of the indexing movement of the conveyor. The single revolution clutches in the applicators 16, 18 are engaged by the switch means 190 so that the crimping strokes of the applicators commence immediately after the leads are gripped by the jaws 157, 159. Finally, switch means on the applicators de-energize the solenoids 186 immediately prior to crimping so that the lead ends are not held by the jaws at the moment of crimping thereby to avoid any tensile stress in the lead ends during crimping.

To briefly review the operation of the apparatus of FIGS. 1-11, during each operating cycle, the head 26 of the feeding, cutting, and stripping apparatus 10 moves forwardly toward the conveyor to pull two wires from the wire sources, i.e. barrels or reels. The wires are cut and stripped upon closure of the blocks 30, 32 and the trailing ends of the two leads thus produced are delivered to the wire gripper assembly 14 located immediately beneath the pulling jaws 28. The conveyor is indexed and the upper lead 2 held in one of the wire gripper assemblies 14 is delivered to the crimping die and anvil 154, 156 of the terminal press 16. At the same time, the lower lead 4 of a wire gripper 14 which is down-stream from the first press 16 is delivered to the crimping die and anvil 154′, 156′ of the second terminal applicator press 18. Also, during indexing of the conveyor, the jaws of a wire gripper assembly adjacent to the bin 22 are opened by the opening cam 192 and two completed leads are dropped into the receiving bin 22. It will be understood that the wire pulling operation of the feeding, cutting, and stripping mechanism 10 can be carried out immediately after indexing of the conveyor and while terminals are being applied by the terminal applicator presses 16, 18.

It will be apparent from the foregoing description of the embodiment of FIGS. 1-11 that machines in accordance with the invention can be provided with lead grippers 14′ (FIG. 12) which are adapted to hold three electrical leads rather than two leads and that a deflecting means can be arranged to selectively present the ends of each lead to one of three crimping presses. In FIG. 12, the lead gripper 14′ carries three leads 2, 3, 4 leftwardly past three separate crimping stations having crimping dies and anvils 154, 156, 154′, 156′, and 154″, 156″. The deflecting means comprises upper and lower deflector members 204, 206, the upper deflecting member having a web 208 and the lower deflecting member having a web 210. The web 208 of the upper deflector extends from a location immediately up-stream from the first crimping station to a location down-stream from the third crimping station while the web 210 of the lower deflector 208 extends from a location up-stream of the first crimping station to a location down-stream from the second crimping station. The upper deflector 204 has an upstanding flange 212 which begins at a location immediately up-stream from the first crimping station and ends between the second and third crimping station. The lower deflecting member 206 has two depending flanges, the first of which 214 extends from a location upstream from the first crimping station to a location between the first and second crimping stations. The remaining depending flange 216 of the lower deflector 206 extends from a location between the second and third crimping stations to a location immediately downstream from the third crimping station. The righthand ends of the webs 208, 210 are, as with the previous embodiment, swaged to form approximate knife edges and the two webs are spaced apart by a distance slightly greater than the thickness of the center lead 3. An additional deflector plate 218 is mounted against the rearward faces of the flanges 212, 216 and extends from a location between the first and second crimping stations to a location between the second and third crimping stations. As with the previous embodiment, the deflector structure is supported on the frame plate by suitable bracket members 220, 222.

In accordance with the embodiment of FIG. 12, the upper and lower leads 2, 4 are deflected by the upstanding and depending flanges 212, 214 as the lead gripper passes the first crimping station and the center lead 3 is permitted to project through the space between the two webs 208, 210 so that it is terminated at the first crimping station. As the lead gripper on the conveyor moves leftwardly in FIG. 12, this terminated center lead 3 is deflected by the auxiliary plate 218 and the upper lead 2 is held in a deflected condition by the upstanding flange 210 of the upper deflector 204. However, since the depending flange 214 of the lower deflector 206 ends between the first and second crimping stations, the lowermost lead 4 is permitted to assume its more or less normal shape and is gripped by the gripping jaws at the second crimping station. The terminal is thus applied to this lowermost lead 4 at the second crimping station. The lower lead 4 and the center lead 3 are deflected by the second depending flange 216 of the upper deflector as the lead gripper assembly 14′ moves past the third crimping station. The upper lead 2 is thus permitted to assume its normal orientation and is terminated at the third crimping station. As with the previous embodiment wire gripping jaws of the type shown in FIG. 7 are provided at each crimping station to ensure that the ends of the leads will be accurately located between the crimping die and anvil of the station.

The invention has been found to offer significant advantages to the lead manufacturer under many circumstances. The affect of the invention is to double or almost double the productivity of lead making machines of the general type shown in the previously identified patent to Andren 2,768,425.

FIG. 13 shows an alternative embodiment of the invention which is adapted to apply terminals to both of the ends of the leads produced by the wire feeding, cutting, and stripping apparatus. The apparatus of FIG. 13 can be constructed generally in accordance with the teachings of U.S. patent to Andren 3,029,494 to which reference was previously made.

The wire feeding, lead cutting, and insulation stripping mechanism 224 of this embodiment has a reciprocating head 230, from which a pair of jaws 233 depend, which is mounted on a rod 231. Upon reciprocation of the head 230, wires 226, 228 are pulled from two endless sources, these endless sources comprising barrels in the disclosed embodiment. The wire cutting and insulation severing blades or knives are mounted on reciprocable blocks 240, 242 which move relatively towards each other to cut the leads from the ends of the fed wires and to sever the insulation as previously described.

The conveyor means of the embodiment of FIG. 13 comprises a pair of spaced apart chain type conveyors 232, 234 which have aligned cooperating pairs of wire clamps thereon 236, 238. A pair of severed leads are delivered to each cooperating pair of wire clamps so that the stripped ends of the leads extend laterally on each side of the two conveyors. Crimping presses 244, 246, 248 and 250 are provided on each side of the conveyor path and the deflector means 252, 254, 256, 258 are mounted adjacent to each crimping press. The deflector means may be in general in accordance with the teachings of the embodiment of FIG. 1 although in FIG. 13, the plates which deflect the wires are not continuous. As with the previous embodiment, stationary wire end or lead end positioning jaws are mounted adjacent to each of the presses to insure the lead ends will be accurately positioned between the crimping die and anvil of the press.

After terminals have been applied to the ends of the leads carried by the conveyor, the jaws are opened at the lefthand end of the conveyor and the finished leads drop into a suitable bin or container 260.

Changes in construction will occur to those skilled in the art and various apparently different modifications and embodiments may be made without departing from the scope of the invention. The matter set forth in the foregoing description and accompanying drawings is offered by way of illustration only.

I claim:

1. A machine for applying terminals or the like to the ends of electrical leads comprising
   a conveyor movable along a predetermined path,
   a plurality of gripping devices as spaced apart intervals on said conveyor, each of said gripping devices being adapted to grip a plurality of leads with the axes of said leads extending parallel to, and coplanar with, each other and defining a plane extending transversely of the path of said conveyor,
   a loading station on said path, means at said loading station for loading a plurality of electrical leads into each of said gripping devices with the trailing ends of said leads extending laterally of said path on one side thereof,
   a plurality of terminal applying mechanisms on said one side of said path at spaced apart locations downstream, relative to the direction of travel of said conveyor, from said loading station,
   a plurality of lead end deflecting means, each of said lead end deflecting means being associated with one of said terminal applying mechanisms and being effective selectively to deflect all of the trailing ends of said leads excepting the trailing end of one lead whereby said one lead is terminated, and each of said lead end deflecting means being effective to deflect a different combination of lead ends whereby all of said lead ends have terminals applied thereto.

2. A machine as set forth in claim 1 wherein each of said gripping devices is adapted to grip two leads.

3. A machine as set forth in claim 1 wherein each of said deflecting means comprises static plate means engageable with said leads.

4. A machine as set forth in claim 1 including a stationary lead end gripping means associated with each of said terminal applying mechanisms, each lead end straightening means being located between its associated terminal applying mechanism and said conveyor and being adapted to straighten a lead adjacent to its end thereby accurately to locate the end of the lead in the terminal applying mechanism.

5. A machine as set forth in claim 4 wherein each of said lead end straightening means comprises a pair of closable jaws.

6. A machine as set forth in claim 1 wherein each of said gripping devices is adapted to grip said leads at a location adjacent to their ends, said machine being effective to produce leads having terminals on one end thereof.

7. A machine as set forth in claim 1 wherein each of said gripping devices comprises a cooperating duality of lead grippers, each duality being adapted to grip a plurality of leads adjacent to their ends, said machine having an additional plurality of terminal applying mechanisms on the other side of said path, a plurality of lead end deflecting means associated with terminal applying mechanism of said additional plurality of terminal applying mechanisms, said machine being adapted to produce a plurality of leads having terminals on both of their ends.

8. A machine for applying terminals or the like to the ends of electrical leads comprising
   a conveyor movable along a predetermined path,
   a plurality of gripping devices at spaced apart intervals on said conveyor, each of said gripping devices being adapted to grip two leads with the axes of said leads extending parallel to, and co-planar with, each other and defining a plane extending transversely of the path of said conveyor,
   a loading station on said path, means at said loading station for loading two electrical leads into each of said gripping devices with the trailing ends of said leads extending laterally of said path on one side thereof,
   terminal applying mechanisms on said one side of said path at spaced apart locations downstream, relative to the direction of travel of said conveyor, from said loading station,
   lead end deflecting means, said lead end deflecting means being associated with one of said terminal applying mechanisms and being effective selectively to deflect the trailing end of one of said leads and not the trailing end of the other lead whereby said one lead is presented to said one terminal applying mechanism and terminated.

References Cited

UNITED STATES PATENTS

| | | | |
|---|---|---|---|
| 2,768,425 | 10/1956 | Andren | 29—630 |
| 2,827,940 | 3/1958 | Davis et al. | 29—203X |
| 3,283,398 | 11/1966 | Andren | 29—630 |
| 3,455,006 | 7/1969 | Reem et al. | 29—203 |

GRANVILLE Y. CUSTER, JR., Primary Examiner